United States Patent [19]
Lohmeyer et al.

[11] Patent Number: 6,070,206
[45] Date of Patent: May 30, 2000

[54] METHOD AND APPARATUS FOR TERMINATING A BUS

[75] Inventors: John B. Lohmeyer; Lawrence C. Barnes, both of Colorado Springs, Colo.

[73] Assignee: LSI Logic Corporation, Milpitas, Calif.

[21] Appl. No.: 08/829,409

[22] Filed: Mar. 31, 1997

[51] Int. Cl.[7] .................................................. G06F 13/00
[52] U.S. Cl. .......................... 710/101; 710/102; 710/103; 710/2; 710/127
[58] Field of Search ..................... 395/281, 282, 395/283, 284, 280, 306, 309, 285, 822, 828; 326/30; 340/517, 310.01, 310.05; 710/2, 8, 100–105, 126, 127, 129

[56] References Cited

U.S. PATENT DOCUMENTS

| | | | |
|---|---|---|---|
| 4,220,876 | 9/1980 | Ray | 307/296 |
| 4,748,426 | 5/1988 | Stewart | 333/22 |
| 4,831,283 | 5/1989 | Newton | 307/443 |
| 4,920,339 | 4/1990 | Friend et al. | 340/825.52 |
| 4,965,723 | 10/1990 | Kirk et al. | 364/200 |
| 5,029,284 | 7/1991 | Feldbaumer et al. | 307/443 |
| 5,099,137 | 3/1992 | Lattin, Jr. | 307/147 |
| 5,101,481 | 3/1992 | Anger et al. | 395/325 |
| 5,120,909 | 6/1992 | Kutz et al. | 178/63 R |
| 5,157,771 | 10/1992 | Losi et al. | 395/325 |
| 5,191,581 | 3/1993 | Woodbury et al. | 370/85.9 |
| 5,204,669 | 4/1993 | Dorfe et al. | 340/825.52 |
| 5,239,559 | 8/1993 | Brach et al. | 375/36 |
| 5,239,658 | 8/1993 | Yamamuro et al. | 395/800 |
| 5,265,038 | 11/1993 | Kowk | 364/572 |
| 5,313,105 | 5/1994 | Samela et al. | 307/99 |
| 5,313,595 | 5/1994 | Lewis et al. | 395/325 |
| 5,327,114 | 7/1994 | Straate et al. | 340/286.06 |
| 5,338,979 | 8/1994 | Mammano | 307/443 |
| 5,367,647 | 11/1994 | Coulson et al. | 395/825 |
| 5,382,841 | 1/1995 | Feldbaumer | 326/30 |
| 5,410,141 | 4/1995 | Koenck et al. | 235/472 |
| 5,422,580 | 6/1995 | Mandel et al. | 326/30 |

(List continued on next page.)

FOREIGN PATENT DOCUMENTS

| | | | |
|---|---|---|---|
| 0531630 | 3/1993 | European Pat. Off. | G06F 13/40 |
| 0076921 | 4/1993 | European Pat. Off. | G06F 11/34 |
| 0645716 | 3/1995 | European Pat. Off. | G06F 13/40 |
| 0742612 | 11/1996 | European Pat. Off. | H01R 43/26 |
| 0575237 | 12/1993 | France . | |
| 1259442 | of 0000 | Japan . | |
| 5224792 | of 0000 | Japan . | |
| 6414624 | of 0000 | Japan . | |
| 9408035 | 4/1994 | WIPO | G06F 13/40 |

OTHER PUBLICATIONS

Automatic Small Computer System Interface Termination Circuit for Narrow/Wide Devices on Wide Bus; IBM Technical Disclosure Bulletin; vol. 40, No. 4, Apr. 1997; New York, US, pp. 79–82, XP000728275.

BI–0316 Mass Storage Module; Dec. 6, 1996; Brand Innovators B.V. XP002071927; Available from Internet, <URL:http//www.brandinnovators.com/manual/bi0316/book_33.htm>.

*Primary Examiner*—Xuan M. Thai

[57] ABSTRACT

A method and apparatus is disclosed for terminating a SCSI bus having a SCSI port, with the SCSI port having a first set of I/O terminals associated only with wide SCSI buses and a second set of I/O terminals associated with both wide SCSI buses and narrow SCSI buses. The method includes the steps of determining if a first reference signal is present on one terminal of the first set of I/O terminals; determining if a second reference signal is present on one terminal of the second set of I/O terminals; and terminating each terminal of the first set of I/O terminals while not terminating any terminals of the second set of I/O terminals (1) if the first reference signal is not detected in the first reference signal determining step, and (2) if the second reference signal is detected in the second reference signal determining step.

15 Claims, 4 Drawing Sheets

U.S. PATENT DOCUMENTS

| | | | |
|---|---|---|---|
| 5,434,516 | 7/1995 | Kosco | 326/30 |
| 5,450,425 | 9/1995 | Gunn et al. | 371/67.1 |
| 5,455,926 | 10/1995 | Keele et al. | 395/404 |
| 5,465,042 | 11/1995 | Samela et al. | 324/71.1 |
| 5,467,453 | 11/1995 | Kocis | 395/281 |
| 5,469,554 | 11/1995 | Tucker et al. | 395/420 |
| 5,473,264 | 12/1995 | Mader et al. | 326/30 |
| 5,495,584 | 2/1996 | Holman, Jr. et al. | 395/308 |
| 5,510,701 | 4/1996 | Samela et al. | 324/71.1 |
| 5,511,229 | 4/1996 | Tsujimoto | 395/851 |
| 5,546,017 | 8/1996 | Vitunic | 326/30 |
| 5,553,250 | 9/1996 | Miyagawa et al. | 395/309 |
| 5,555,510 | 9/1996 | Verseput et al. | 364/514 |
| 5,564,024 | 10/1996 | Pemberton | 395/283 |
| 5,568,046 | 10/1996 | Samela et al. | 324/71.1 |
| 5,574,946 | 11/1996 | Sala | 395/825 |
| 5,583,448 | 12/1996 | Corder et al. | 326/30 |
| 5,585,741 | 12/1996 | Jordan | 326/30 |
| 5,586,271 | 12/1996 | Parrett | 395/283 |
| 5,613,074 | 3/1997 | Galloway | 395/280 |
| 5,635,853 | 6/1997 | Kikinis | 326/30 |
| 5,664,221 | 9/1997 | Amberg et al. | 395/829 |
| 5,680,537 | 10/1997 | Byers et al. | 395/182.03 |
| 5,680,555 | 10/1997 | Bodo et al. | 395/306 |
| 5,715,409 | 2/1998 | Bucher et al. | 395/309 |
| 5,751,977 | 5/1998 | Alexander | 395/306 |
| 5,764,925 | 6/1998 | Noonan | 395/281 |
| 5,768,621 | 6/1998 | Young | 395/844 |
| 5,781,028 | 7/1998 | Decuir | 326/30 |

METHOD AND APPARATUS FOR TERMINATING A BUS

BACKGROUND OF THE INVENTION

The present invention relates generally to computer buses for transmitting data and, more particularly to automatic termination of such buses to enhance data transmission quality.

Today's standard computer architecture calls for a number of separate components, such as a central processing unit ("CPU"), memory, ports and peripheral devices to be coupled together by electrical buses to provide a pathway for data between the various components. Electrical buses are simply groups of conductors (or lines) designed to operate as a group.

Components transmit data over buses by varying voltages with respect to time (AC) on the various lines of the bus. This voltage change also causes a change in current and thus electromagnetic power on the bus. In binary digital computers, each line in a bus is capable of assuming one of two possible states at a given moment. These states are represented by presence or absence of a voltage, or potential difference relative to ground, on each of the lines.

In the real world, buses are real electrical conductors and therefore under AC conditions, exhibit impedance just as do all real conductors. Varying electromagnetic fields exist around conductors when AC signals are present. These fields store electromagnetic energy. The stored magnetic field energy is associated with a distributed capacitance. As an AC signal propagates down the bus, electromagnetic power decreases along the conductor. The electromagnetic power decrease is associated with a distributed electrical resistance along the conductor. The characteristic impedance of a conductor is defined in terms of the associated power loss and stored electromagnetic energy.

All circuit elements as well as buses exhibit impedance. When two circuit elements with the same impedance are joined, an impedance match is said to occur at the juncture. Conversely, when two circuit elements with different impedances are joined, an impedance mismatch is said to occur. As electromagnetic fields propagate down the conductors and are met with an impedance mismatch, changes in the fields occur. These changes result in either a positive or negative voltage perturbation proportional to the impedance difference, which is then propagated forwards as well as backwards along the line. These voltage perturbations, termed variously "ringing," "over-shoot," "under-shoot," and "droop," may be of sufficient magnitude as to cause components reading data from the bus to misread the voltage, thereby corrupting the flow of data.

An important mismatch occurs at the end of a bus. At this point a change occurs from the characteristic impedance of the line to a non-conducting circuit element, or infinite impedance. The voltage perturbation due to this mismatch is double that of the original signal. Therefore, in such conductors, it is standard practice to provide a mechanism by which to reduce the perturbation, so as to restore data transmission fidelity. This is achieved by the use of a terminating circuit which exhibits an impedance similar to the conductor characteristic impedance. This terminating circuit can include a plurality of resistive elements or active switches.

Some buses require terminating circuits at each end of the bus to provide effective matching. One standard associated with buses is the small computer systems interface ("SCSI") bus. The SCSI bus is designed to operate in conjunction with microcomputers (also termed personal computers or "PCs") to provide an interface to SCSI standard peripheral devices. SCSI buses require a controller card or host card to manage communication of data between the PC and the SCSI devices and between the SCSI devices themselves. In PCs, this controller card is typically placed in a slot within the main chassis of the PC. The controller card contains a control circuit that manages the SCSI bus and at least one SCSI port allowing SCSI devices to couple to the card. SCSI devices are daisy chained together with a common cable. All SCSI devices operate on common signals, and both ends of the cable are terminated with hardware terminating circuits. The terminating circuits, that can be connected to either SCSI devices or to the SCSI cable itself are, as stated above, required to make data transfers on the SCSI bus reliable.

Devices connected to SCSI chains must have the correct number of terminating circuits for proper operation and to prevent damage to the SCSI controller. There can be no more than two terminating circuits in a chain of SCSI devices, one at each end of the physical chain. This means that, if more than two SCSI devices are connected in a SCSI daisy chain, the middle device(s) in the cable must not have terminating circuits coupled to the SCSI bus.

Some controller cards provide two SCSI ports. One port (the "external port") is fitted on a mounting bracket attached to the card, thereby exposing it outside the main chassis when the card is mounted therein. This arrangement allows SCSI devices external to the main chassis to couple to the controller card via the external port. Another port (the "internal port") is mounted to the controller card such that it is exposed in the interior of the main chassis, allowing SCSI devices to be physically mounted within the main chassis and coupled to the internal port.

Since the SCSI bus must be terminated at each end, if both the internal and external ports of the controller card are coupled to SCSI devices, terminating circuits are required at the respective devices. In this case, the controller card is not at the end of the bus and no terminating circuit should be placed on the bus at the controller card. On the other hand, if either one (but not the other) of the external or internal ports is coupled to a SCSI device, then the controller card is at an end of the SCSI bus and a terminating circuit should be placed on the bus at the controller card.

Properly terminating the SCSI bus is even further complicated due to the fact that both narrow and wide SCSI bus widths exists and customers desire controller cards that can simultaneously accommodate both SCSI bus widths. One way to address this desire is to configure at least one of the ports of the controller card to accept both narrow SCSI devices and wide SCSI devices. This complicates the termination of the SCSI bus because the narrow SCSI bus includes only fifty (50) conductors whereas the wide SCSI bus includes sixty-eight (68) conductors. Therefore, depending on which type of device is connected to the port, the controller card may need to terminate the SCSI bus differently.

For example, if a wide SCSI device is coupled to the internal port and a narrow SCSI device is coupled to the external port, the controller is in the middle of the SCSI bus with respect to the narrow portion of the SCSI bus (the 50 conductors common to both a narrow SCSI bus and a wide SCSI bus); however, with respect to the wide portion of the SCSI bus (the remaining 18 conductors of a wide SCSI bus not in common with a narrow SCSI bus) the controller card is at the end of the SCSI bus. Therefore, to properly terminate the SCSI bus in the above example, the SCSI bus would need to be terminated at the wide SCSI device, at the narrow SCSI device, and with respect to the wide portion of the SCSI bus at the controller card. This termination scheme assumes that only the narrow portion of the SCSI bus will be terminated at the narrow SCSI device.

In the past, the user was required to flip configuration switches, install hardware jumpers, or install terminating devices on the controller card to place a terminating circuit on the card when the card was at the end of a portion of the SCSI bus. If the user then added or subtracted SCSI devices or SCSI device types, the configuration switches may have had to be manually changed, depending upon whether the controller card was at the end of a portion of the bus or not.

It is undesirable to force a user, who may not be knowledgeable about SCSI buses and their need for termination and who may be uncomfortable with invading the main chassis, to flip configuration switches, install jumpers or terminating devices. What is needed therefore, is a method and apparatus for automatically determining whether and what types of SCSI devices are coupled to ports of a controller card and either couple or decouple terminating circuits to the SCSI bus as a function of the determination.

SUMMARY OF THE INVENTION

In accordance with one embodiment of the present invention, there is provided a method of terminating a SCSI bus having a SCSI port, with the SCSI port having a first set of I/O terminals associated only with wide SCSI buses and a second set of I/O terminals associated with both wide SCSI buses and narrow SCSI buses. The method includes the steps of determining if a first reference signal is present on one terminal of the first set of I/O terminals; determining if a second reference signal is present on one terminal of the second set of I/O terminals; and terminating each terminal of the first set of I/O terminals while not terminating any terminals of the second set of I/O terminals (1) if the first reference signal is not detected in the first reference signal determining step, and (2) if the second reference signal is detected in the second reference signal determining step.

Pursuant to another embodiment of the present invention, there is provided a controller. The controller includes a control circuit, a first bus port, a first terminating circuit, a second terminating circuit, and a termination control circuit. The control circuit is configured to control transmission of data on a bus having a first set of conductors and a second set of conductors. The first set of conductors define a first bus width. The first set of conductors in combination with the second set of conductors define a second bus width. The first bus port includes a first set of I/O terminals configured to receive a first interconnect cable and to couple a first device to the bus via the first interconnect cable. The first device may utilize either the first bus width or the second bus width. The first terminating circuit is configured to terminate the first set of conductors when activated. The second terminating circuit is configured to terminate the second set of conductors when activated. The termination control circuit is coupled to the first bus port and is configured to selectively activate the first terminating circuit and the second terminating circuit as a function of whether the first device is coupled to the first bus port and whether the first device utilizes the second bus width.

Pursuant to yet another embodiment of the present invention, there is provided a computer system. The computer system includes a controller, a processor, a first SCSI device, a first SCSI port, a first terminating circuit, a second terminating circuit, and a termination control circuit. The controller is configured to control transmission of data on a SCSI bus. The SCSI bus includes a first set of conductors and a second set of conductors. The first set of conductors define a narrow SCSI bus width. The first set of conductors in combination with the second set of conductors define a wide SCSI bus width. The processor is coupled to the SCSI bus via the controller. The first SCSI device is configured to utilize either the narrow SCSI bus width or the wide SCSI bus width. The first SCSI port includes a first set of I/O terminals configured to couple the first SCSI device to the SCSI bus via a first interconnect cable. The first terminating circuit is configured to terminate the first set of conductors when activated. The second terminating circuit is configured to terminate the second set of conductors when activated. The termination control circuit is coupled to the first SCSI port and is configured to selectively activate the first terminating circuit and the second terminating circuit as a function of whether the first SCSI device is coupled to the first SCSI port and whether the first SCSI device utilizes the wide SCSI bus width.

It is an object of the present invention to provide an improved method and apparatus for terminating a bus.

It is yet another object of the present invention to provide a method and system for automatically determining the types of devices coupled to a bus controller and providing proper termination of a bus.

It is still another object of the present invention to provide a method and apparatus for automatically terminating a bus in a system having a port capable of receiving a plurality of dissimilar bus widths.

It is still yet another object of the present invention to provide a method and apparatus for determining whether a wide SCSI device is coupled to a port capable of receiving either a wide SCSI device or a narrow SCSI device and properly terminating a SCSI bus in response to the determination.

The above and other objects, features, and advantages of the present invention will become apparent from the following description and the attached drawings.

DETAILED DESCRIPTION OF THE PREFERRED EMBODIMENTS

Figure 1:
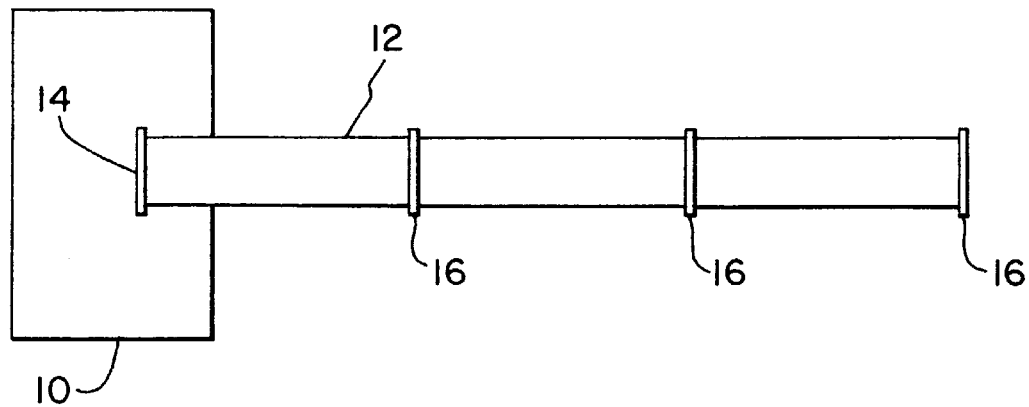
FIG. 1 shows a controller card and interconnect cable having a plurality of connectors.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

FIG. 1 shows a controller card 10, having a cable 12 attached thereto. This cable 12 typically has a connector 14 that allows the cable 12 to be detachably coupled to a receiving connector or port on the controller card 10. The controller card 10 is sometimes referred to as a host controller card when used as part of a SCSI bus interconnection scheme. The name comes from the fact that the controller card 10 would be plugged into a bus connector of a host computer (not shown), and provides the electrical and programming interface between a host central processor, and devices attached to the cable 12. These devices plug into the cable 12 at various intervening and ending locations across the span of the cable, such as at connectors 16.

Figure 2:
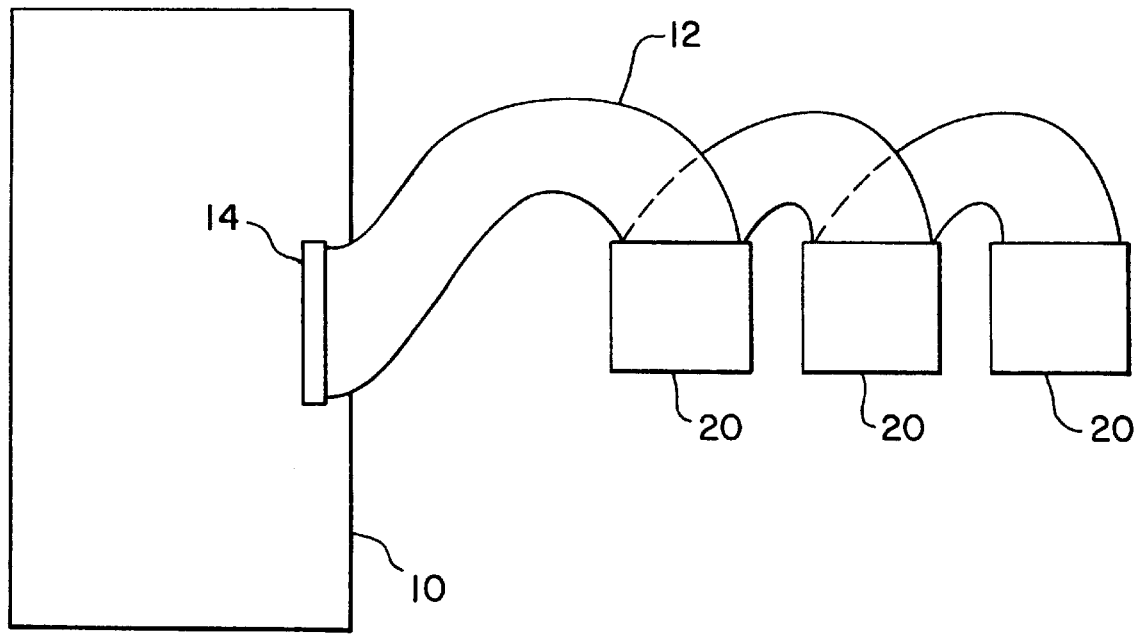
FIG. 2 shows a controller card and a plurality of peripheral devices coupled together with an interconnect cable in a daisy-chain fashion.

FIG. 2 shows a typical SCSI bus, where a plurality of devices 20 such as disk drives are coupled to cable 12. Other types of SCSI-compliant devices could also be similarly coupled, such as tape drives, compact disk (CD) drives, and the like. As can be seen, a single cable 12 couples a plurality of devices 20 to a controller card 10. This controller card 10 is preferably a separate hardware card plugged into the internal bus of a computer, but could alternatively be integrated circuitry on the main system board of the computer, such as a motherboard.

In the preferred embodiment, each of these peripheral devices 20 has a mechanism for coupling a terminating circuit to the bus at a device 20 for appropriately terminating the bus width utilized by device 20. In other words, if a device 20 is a narrow SCSI device, then the device 20 has mechanism for coupling a terminating circuit that terminates a narrow SCSI bus. However, if a device 20 is a wide SCSI device, then the device 20 has mechanism for coupling a terminating circuit that terminates a wide SCSI bus. These mechanism for coupling a terminating circuit may consist of a socket, where a resistor-pack (RPAK) can be manually inserted; a jumper or switch that can be used to manually enable a terminating circuit; or a sensing circuit for automatically enabling an internal terminating circuit.

Figure 3:
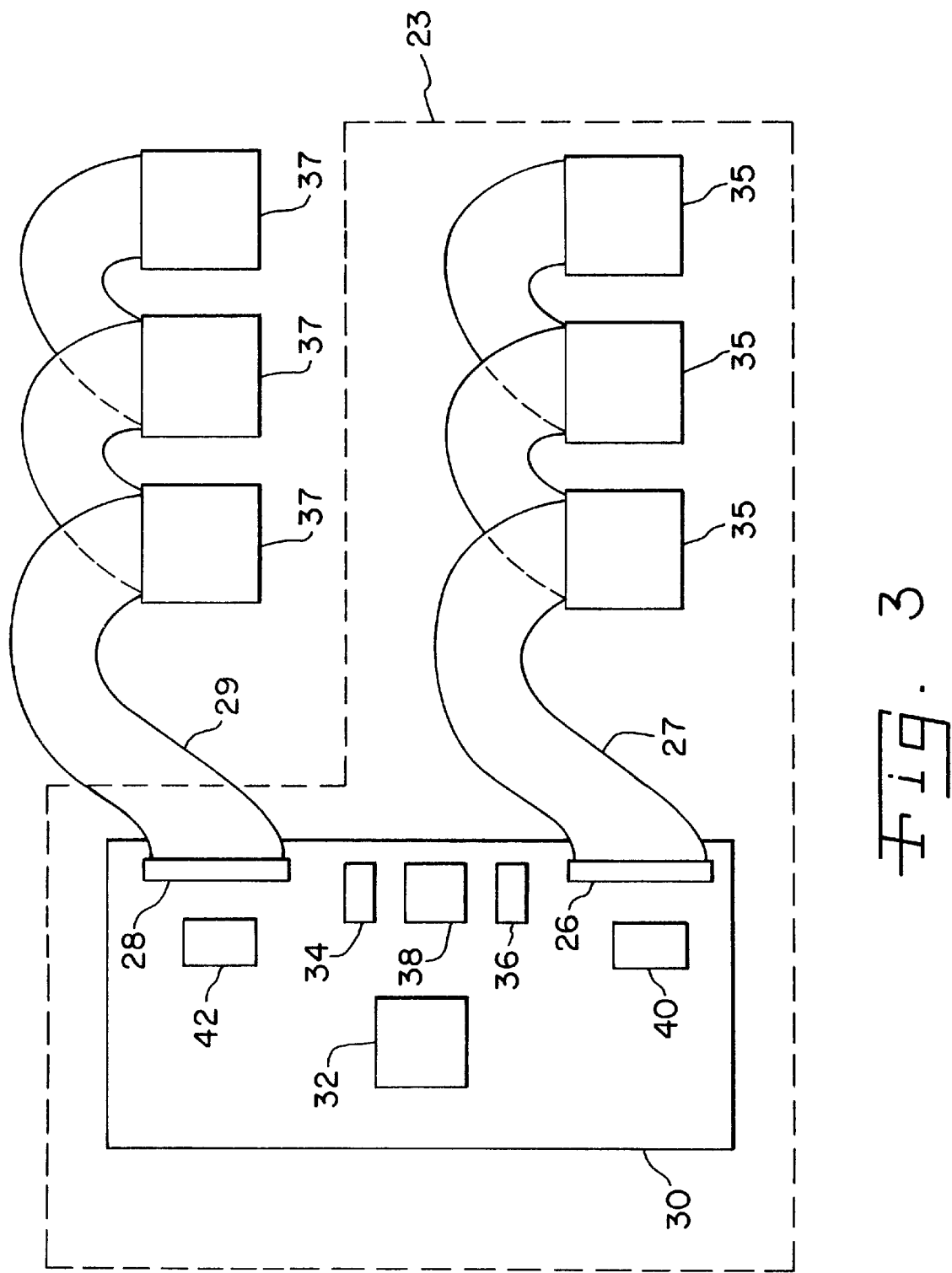
FIG. 3 shows a controller card suitable for having a plurality devices with dissimilar bus width types coupled thereto.

FIG. 3 shows a system where a plurality of devices are coupled to a host controller card 30. In the preferred embodiment, the controller card 30 includes a SCSI bus controller 32, two terminating circuits or terminators 34, 36, a termination control 38, two detection circuits 40, 42, and two wide SCSI ports or connectors 26, 28 that may receive narrow SCSI devices via a narrow-to-wide SCSI adapter or cable.

The SCSI bus controller 32, in the preferred embodiment, is a SCSI interface controller chip 53C825 available from Symbios Logic Inc., Ft. Collins, Colo. (previously known as NCR Corporation, Microelectronics Products Division), and provides an interface between the SCSI bus 25 (FIG. 4) and the host computer system (not shown). This SCSI bus controller 32 transmits and receives data and control signals across the SCSI bus 25 (the SCSI protocol and interface signals are well known in the art, and need not be further described).

A narrow-to-wide SCSI adapter is a piece of hardware that has a first connector configured to receive a narrow SCSI cable and a second connector configured to couple the conductors of the narrow SCSI cable to the appropriate conductors of a wide SCSI port. A narrow-to-wide SCSI cable, on the other hand, is a cable having a first connector configured to couple to a narrow SCSI device, and a second connector configured to appropriately couple the narrow SCSI device to a wide SCSI port via the cable.

The configuration of SCSI ports 26, 28 allows internal narrow SCSI devices 35, internal wide SCSI devices 35, external narrow SCSI devices 37, and external wide SCSI devices 37 to be used with the controller card 30. The distinction between internal and external pertains to whether the devices are internal or external to the particular computer housing 23 in which the controller card 30 resides. For example, one computer configuration may have an internal wide 540 Megabyte hard disk drive mounted inside the housing of a personal computer, while also having an external narrow CD-ROM disk drive laying on a desk beside the personal computer. In this configuration, an internal cable 27 would couple the internal hard disk drive 35 to the internal port 26, and an external cable 29 would couple the CD-ROM drive to the external port 28 of the controller card 30 (alternatively, the external cable from the CD-ROM drive could attach to a connector mounted on the housing of the computer, with another cable running inside the housing from the housing connector to the adapter connector).

The main point here is that the controller card 30 has a plurality of ports 26, 28 that may each receive devices 35, 37 of dissimilar bus widths. This allows for attachment of a plurality of dissimilar types of devices (for example devices having different data widths such as narrow SCSI devices and wide SCSI devices).

A particular feature of the present invention is to be able to selectively enable/disable the two terminating circuits 34, 36 that reside on the controller card 30. The selective enablement/disablement of the terminating circuits 34, 36 is done in response to whether and what types of devices are coupled to the ports 26, 28. As described above, proper termination is required on both ends of a SCSI bus, in order to reduce signal distortions such as reflections that can otherwise result during high speed transmission over an improperly terminated bus. The present invention relates to the selective termination of portions of a SCSI bus on the "host" side. Proper termination is still required at the "peripheral" side and may be accomplished by several known methods.

Figure 4:
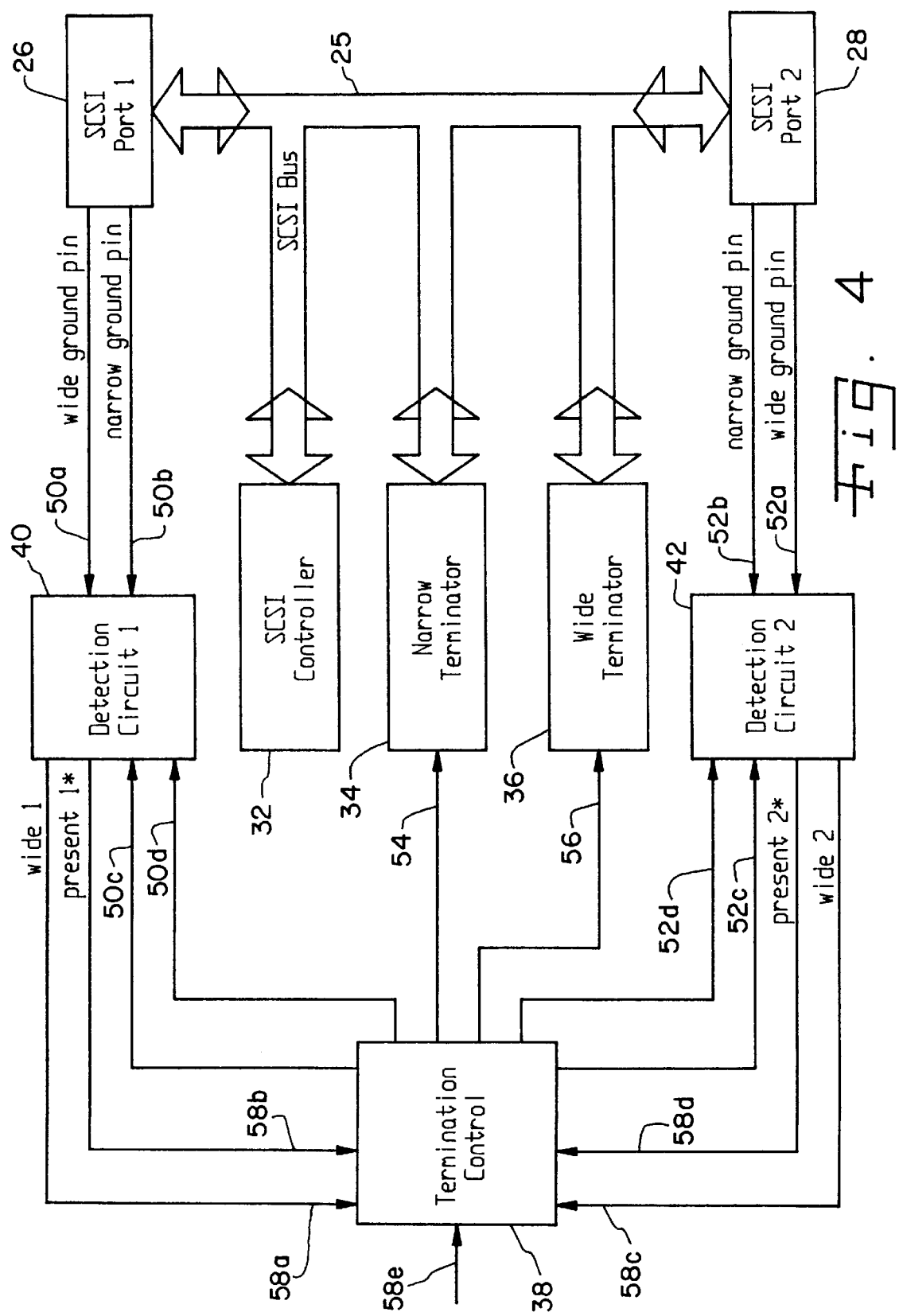
FIG. 4 shows a block diagram illustrating the interconnections between various components of the controller card of FIG. 3.

Turning now to FIG. 4, a block diagram illustrates the interconnections between the various components that constitute the controller card 30 (FIG. 3). A SCSI bus 25 couples a SCSI controller 32 to a first SCSI bus port 26 and a second SCSI bus port 28. It does not matter whether the first port 26 or the second port 28 is the external or internal port nor does it matter whether the first port 26 and the second port 28 are both internal ports or both external ports. However, in most environments one port will be an external port and the other port will be an internal port. Furthermore, the two ports 26, 28 may be of different bus widths. In other words, the first port 26 may be a wide SCSI port and the second port 28 may be a narrow SCSI port. However in the preferred embodiment, the two ports 26, 28 are both wide SCSI ports capable of also receiving narrow SCSI devices with a proper narrow-to-wide adapter or cable. This preferred configuration provides a user with the widest range of devices which may be coupled to the controller card 30.

The present invention, in a preferred embodiment, involves borrowing a particular ground pin or I/O terminal from each of the ports 26, 28 for purposes of determining presence of a device at each of the ports 26, 28. Furthermore in a preferred embodiment, the present invention involves borrowing yet another ground pin or I/O terminal from each of the wide ports 26, 28 for purposes of determining the type of device coupled to the two ports 26, 28. A first detection circuit 40 is coupled to two particular ground pins of the first port 26 and impresses either a high or a low voltage upon the present1* line 58*b* and the wide1 line 58*a* ("*" denotes active when low) depending upon whether and what type of a device is coupled to the first port 26. In particular, the first detection circuit 40 impresses a low voltage on the present1* line 58*b* (active state) when either a wide or narrow device is coupled to the first port 26. Furthermore, the detection circuit 40 impresses a high voltage on the wide1 line 58*a* (active state) when a wide device is coupled to the first port 26.

A second detection circuit 42 is coupled to two particular ground pins of the second port 28 and impresses either a high or a low voltage upon a present2* line 58*d* and a wide2 line 58*c* depending upon whether and what type of a device is coupled to the second port 28. In particular, the second detection circuit 42 impresses a low voltage on the present2* 58*d* when either a narrow or wide device is coupled to the second port 28. Furthermore, the detection circuit 42 impresses a high voltage on the wide2 line 58*d* when a wide device is coupled to the second port 23. The details of both the first detection circuit 40 and the second detection circuit 42 will be discussed in further detail below in regards to FIG. 5.

The termination control 38 receives the wide1 line 58*a*, present1* line 58*b*, wide2 line 58*c*, and the present2* 58*d* and causes terminating circuits 34, 36 to couple to or decouple from the SCSI bus 25 as a function of the status or voltage level of the wide1 line 58*a*, the present1* line 58*b*, the wide2 line 58*c*, and the present2* line 58*d*.

For example, if both the present1* line 58*b* and the present2* line 58*d* are active, then the termination control 38 deactivates the enable line 54 causing the terminating circuit 34 to decouple from the narrow portion of the SCSI bus 25 because the controller card 30 is located in the middle of the narrow portion of the SCSI bus 25, and bus termination for the narrow portion of the SCSI bus 25 should occur in the devices 35, 37. If either of the present1* line 58*b* or the present2* line 58*d* is not active, then the termination control 38 activates the enable line 54 causing the terminating circuit 34 to couple to the SCSI bus 25 because the controller card 30 is located at an end of the narrow portion of the SCSI bus 25.

Likewise, if both the wide1 line 58*a* and wide2 line 58*c* are active, then the termination control 38 deactivates the enable line 54 causing the terminating circuit 36 to decoupled from the wide portion of the SCSI bus 25, because the controller card 30 is located in the middle of the wide portion of the SCSI bus 25, and bus termination for the wide portion of the SCSI bus 25 should occur in the devices 35, 37. If either the wide1 line 58*a* or wide2 line 58*c* is not active, then the termination control 38 activates the enable line 54 causing the terminating circuit 36 to couple to the wide portion of the SCSI bus 25 because the controller card 30 is located at an end of the wide portion of the bus 25.

In a preferred embodiment of the invention, the terminating circuits 34, 36 are each a UC80989DWP, manufactured by the Unitrode Corporation. The UC80989DWP provides a DISABLE input that, when brought low by the termination control 38, decouples the UC80989DWP from the SCSI bus 25. Terminating circuits by other manufacturers are provided with similar inputs allowing them to be selectively coupled and decoupled.

There are many ground pins available on the standard SCSI connector that can be borrowed for the present invention. However, to minimize the chance that a device requires that the pin always be grounded, the present invention preferably makes use of ground pins that are paired with adjacent ground pins on the connector. These pin pairs are currently 1-26, 16-41 and 25-50 for a differential port and 11-36 and 17-42 for a single-ended port. Only one of these pins is required for the present invention's use.

Figure 5:
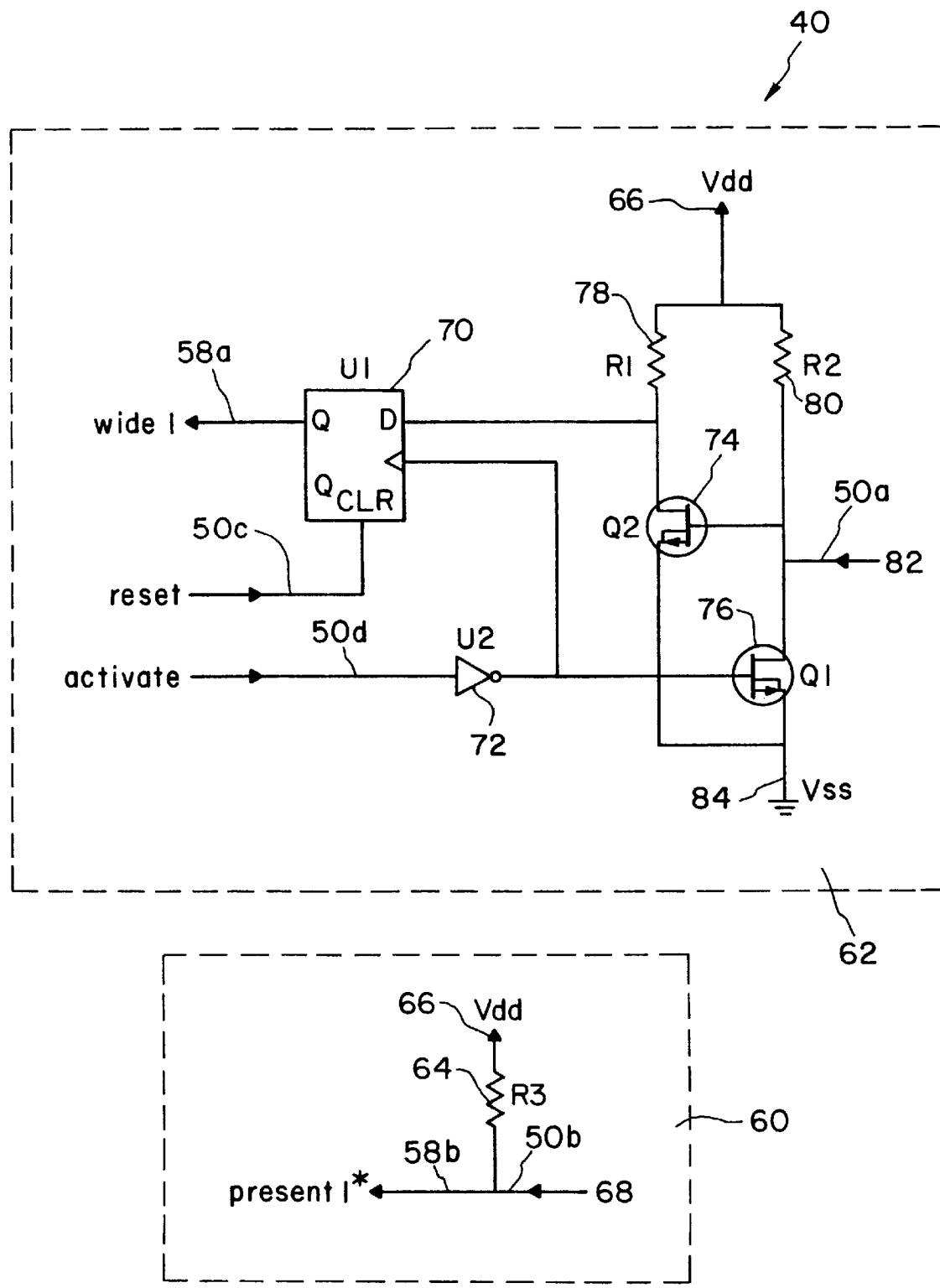
FIG. 5 is a schematic of circuitry used to detect whether a device is coupled to a port and what type of device is coupled thereto.

Now referring to FIG. 5, there is shown a circuit diagram for the first detection circuit 40 of FIG. 4. The second detection circuit 42 may be implemented using circuitry similar to the first detection circuit 40. Therefore, the second detection circuit 42 will not be described in any further detail except by way of analogy to the following description of the first detection circuit 40.

The first detection circuit 40 includes two sub-circuits 60, 62. The sub-circuit 60 impresses either a high or a low voltage upon the present1* line 58*b*. The voltage that the sub-circuit 60 impresses on the present1* line 58*b* is dependent upon whether a device 35 is coupled to the first port 26. The sub-circuit 62 impresses either a high or a low voltage upon the wide1 line 58*a*. The voltage that the sub-circuit 62 impresses on the wide1 line 58*a* is dependent upon what type of device 35 is coupled to the first port 26.

The sub-circuit 60 includes a pull-up resistor 64 coupled between a voltage source 66 and a ground line 50*b*. The ground line 50*b* is coupled to a ground pin 68 of the first port 26. In the preferred embodiment the resistor 64 is 4.7 kilo-ohms (KΩ), although other values such as 1 KΩ or 10 KΩ are also possible. The voltage source 66 is preferably +5 volts (V), although other values such as +3 volts or +12 V are also possible. The ground pin 68 may be one of several ground pins of the first port 26 that correspond or that are associated with the narrow portion of the SCSI bus 25. However, to minimize the chance of corrupting data on the SCSI bus 25, the present invention preferably makes use of ground pins that are paired with adjacent ground pins on the first port 26. As disclosed in the American National Standards Institute (ANSI) Document, X3.253-1995 SCSI-3 Parallel Interface, the disclosure of which is hereby incorporated by reference, these pin pairs are currently associated with SCSI bus conductor numbers 29-30, 31-30, 39-40, and 43-44 for both the narrow single-ended port, and the narrow portion of a wide single-ended port. Only one of these pins is required by the sub-circuit 60. Finally, the present1* line 58*b*, which is the output of sub-circuit 60, is coupled to the ground pin 68.

In operation, the resistor 64 and the voltage source 66 impress a voltage on the ground pin 68 when no device 35 is coupled to the first port 26. Therefore, when no device 35 is coupled to the first port 26, the present1* line 58*b* has a voltage impressed on it and is considered to be in a high, not active state. On the other hand, if a device 35 is coupled to the first port 26, the device 35 grounds the particular ground pin 68 thereby causing the present1* line 58*b* to enter a low, active state. Thus, the ground pin 68 is high if no device is present and low if at least one device 35 is present (more than one device 35 could be coupled to the port via a daisy-chain configuration).

The sub-circuit 62 is more complicated than sub-circuit 60 because there are no ground pin pairs in the wide portion of the SCSI bus 25 for sub-circuit 62 to utilize. As a result, the sub-circuit 62 must include additional hardware in order to maintain data integrity on the SCSI bus 25. The sub-circuit 62 includes a flip-flop or latch 70, and an inverter 72, two transistors 74, 76, and two resistors 78, 80. The resistor 78 is coupled between the drain of transistor 74 and voltage source 66. The resistor 80 is coupled between the drain of transistor 76 and the voltage source 68. The gate of transistor 74 and the drain of transistor 76 are coupled to a ground line 50*a*. The ground line 50*a* is coupled to a ground pin 82 of the first port 26. The source of transistor 74 and the source of transistor 76 are coupled to reference voltage 84 which is typically ground.

The input of the inverter 72 is coupled to the activate line 50*d*, and the output of the inverter 62 is coupled to the gate of the transistor 76 and to the clock input of the flip-flop 70. The data input of the flip-flop 70 is coupled to the source of the transistor 74, and the output of the flip-flop 70 is coupled to the wide1 line 50*a*. Finally, the reset line 50*c* is coupled to the clear input of the flip-flop 70.

In the preferred embodiment, the ground pin 68 may be one of several ground pins of the first port 26 that correspond or that are associated with the wide portion of the SCSI bus 25. These ground pins are currently 1-5, 31-34 when using a standard 0.025 inch centerline flat-ribbon cable for a wide single-ended port. Only one of these pins is required by the sub-circuit 62. Finally, the wide1 line 58*a*, which is the output of sub-circuit 62, is coupled to the non-inverting output of the flip-flop 70.

In operation, when the activate line 50*d* is asserted (forced high) the output of the inverter 72 is forced low which causes the transistor 76 to turn off. When transistor 76 is turned off, the selected ground pin 82 is effectively decoupled from the reference voltage 84 thereby allowing the voltage potential on the selected ground pin 82 to bias the gate of the transistor 74.

If no wide device 35 is coupled to the first port 26, the voltage source 66 and the resistor 80 will impress a voltage on the ground line 50*a* and the gate of the transistor 74. This voltage on the gate of the transistor 74 will cause the transistor 74 to turn on. With transistor 74 turned on, the data input of the flip-flop 70 is forced to a low state.

If a wide device 35 is coupled to the first port 26, the device 35 will force the ground line 50*a* through ground pin 82 to ground, thus turning off the transistor 74. With the transistor 74 turned off, the data input of the flip-flop 70 is forced to a high state by the resistor 78 and the voltage source 66.

Finally, once the activate line 50*d* is deasserted (forced low), the clock input of the flip-flop 70 makes a low-to-high transition causing the flip-flop 70 to latch the value on its data input. Furthermore, the deassertion of the active line 50*d* forces the gate to the transistor 76 high thus turning the transistor 76 on. With the transistor 76 turned on, the ground pin 82 is effectively coupled to the reference voltage 84.

If termination control 38 (FIG. 4) only asserts the activate line 50*d* when the wide portion of the SCSI bus 25 is in an idle state (a state where nothing is being transferred on the wide portion of the bus 20), then data on the wide portion of the SCSI bus 25 will not be corrupted by the sub-circuit 62. In other words, because the sub-circuit 62 effectively couples the selected ground pin 82 back to the reference voltage 84 prior to the wide portion of the SCSI bus 25 entering a busy state (a state where the wide portion of the SCSI bus 25 is not idle), data transmissions on the wide portion of the SCSI bus 25 should be more reliable than if circuitry similar to sub-circuit 60 were used on a ground pin of the wide portion of the SCSI bus 25.

This increase in reliability is a direct result of the fact that the ground pins of the first port 22 should be coupled to the reference voltage 84 during use; however, the circuitry used in sub-circuit 60 does not couple the selected ground pin to the reference voltage 84. Because sub-circuit 60 utilizes a ground pin that is not paired with a data line, the sub-circuit 60 may, without affecting data reliability, fail to couple the selected ground pin 68 to the reference voltage 74. However, because there are no ground pins in the wide portion of the SCSI bus 25 that are not paired with a data line, the sub-circuit 62 must couple the selected ground pin 82 back to the reference voltage 84 prior to wide data transmission, thus the extra hardware.

A setup line 58*e* carries a setup signal to the termination control 38, allowing a setup signal, occasionally issued as standard SCSI protocol, to signal the termination control 38 that the status of the wide1 line 58*a*, the present1* line 58*b*, the wide2 line 58*c*, and the present2* line 58*d* should be determined and the terminating circuits 34, 36 should be configured in response thereto.

Finally the reset line 50*c* provides the termination control 38 with a way of clearing the value that is latched in the flip-flop 70. The termination control 38 may need to clear the flip-flop at system power up in order to initialize the flip-flop 70. It should be appreciated that the various control signals could be generated by the SCSI controller 32, by a host processor of a computer system that the controller card 30 is seated within, or taken directly from the SCSI bus 25. For example, the SCSI bus 25 issues a reset signal at times (such as at power up) which could be used on the reset line 50*c* and the activate line 50*d*.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method of terminating a SCSI bus having a SCSI port, with the SCSI port having a first set of I/O terminals associated only with wide SCSI buses and a second set of I/O terminals associated with both wide SCSI buses and narrow SCSI buses, comprising the steps of:

decoupling a ground terminal of the first set of I/O terminals from a ground voltage;

generating in response to the decoupling step, a first signal that is indicative of whether at least one device is coupled to the ground terminal of the first set of I/O terminals;

generating a second signal that is indicative of whether at least one device is coupled to one terminal of the second set of I/O terminals;

terminating each data terminal of the first set of I/O terminals based upon the first signal;

terminating each data terminal of the second set of I/O terminals based upon the second signal; and coupling the ground terminal of the first set of I/O terminals to the ground voltage before said SCSI bus enters a busy state.

2. The method of claim 1 wherein:

the decoupling step includes the step of decoupling the ground terminal of the first set of I/O terminals from the ground voltage when said SCSI bus is in an idle state, and the first generating step comprises the step of generating the first signal when said SCSI bus is in the idle state.

3. The method of claim 1, further including the steps of:

storing a first status value that represents said first signal.

4. The method of claim 3, further including the step of:

clearing the first status value in response to a reset signal.

5. A controller, comprising:

a control circuit configured to control transmission of data on a bus comprising a first set of conductors and a second set of conductors, said first set of conductors defining a first bus width, said first set of conductors in combination with said second set of conductors defining a second bus width;

a first bus port comprising a first plurality of I/O terminals configured to receive a first interconnect cable and to couple a first device to said bus via said first interconnect cable, said first device utilizing a bus width selected from a group of bus widths comprising said first bus width and said second bus width;

a first terminating circuit configured to terminate each data line conductor of said first set of conductors when activated;

a second terminating circuit configured to terminate each data line conductor of said second set of conductors when activated;

a termination control circuit coupled to said first bus port and configured to selectively activate said first terminating circuit and said second terminating circuit as a function of whether said first device is coupled to said first bus port and whether said first device utilizes said second bus width; and a first detection circuit configured to (i) decouple a first I/O terminal of said first plurality of I/O terminals from a reference voltage based upon said bus entering an idle state said first I/O terminal being coupled to one conductor of said second set of conductors, (ii) generate in response to decoupling said first I/O terminal from said reference voltage a first status value that indicates whether said first device utilizes said second bus width based upon a first voltage of said first I/O terminal, and (iii) couple said first I/O terminal to said reference voltage when said bus is in a busy state.

6. The controller of claim 5, wherein:

said first bus width comprises a narrow SCSI bus width; and said second bus width comprises a wide SCSI bus width.

7. The controller of claim 5, further comprising:

a second detection circuit configured to generate a second status value that indicates whether said first device is coupled to said first bus port based upon a second voltage of a second I/O terminal of said first plurality of I/O terminals that is coupled with one conductor of said first set of conductors.

8. The controller of claim 7, further comprising:

a first storage element configured to store said first status value; and a second storage element configured to store said second status value.

9. The controller of claim 8, wherein:

said first storage element and said second storage element are both configured to clear in response to a reset signal.

10. The controller of claim 5, further comprising:

a second bus port configured to receive a second interconnect cable and to couple a second device to said bus via said second interconnect cable; and wherein said function of said termination control circuit is further dependent upon whether said second device is coupled to said second bus port.

11. The controller of claim 10, wherein:

said second device utilizes a bus width selected from said group of bus widths; and said function of said termination control circuit is further dependent upon whether said second device utilizes said second bus width.

12. A computer system, comprising:

a controller configured to control transmission of data on a SCSI bus comprising a first set of conductors and a second set of conductors, said first set of conductors defining a narrow SCSI bus width, said first set of conductors in combination with said second set of conductors defining a wide SCSI bus width;

a processor coupled to said SCSI bus via said controller;

a first SCSI device configured to utilize a bus width selected from a group of bus widths comprising said narrow SCSI bus width and said wide SCSI bus width;

a first SCSI port comprising a first plurality of I/O terminals configured to couple said first SCSI device to said SCSI bus via a first interconnect cable;

a first terminating circuit configured to terminate each data line conductor of said first set of conductors when activated;

a second terminating circuit configured to terminate each data line conductor of said second set of conductors when activated;

a termination control circuit coupled to said first SCSI port and configured to selectively activate said first terminating circuit and said second terminating circuit as a function of whether said first SCSI device is coupled to said first SCSI port and whether said first SCSI device utilizes said wide SCSI bus width; and a first detection circuit configured to (i) decouple a ground terminal of said first plurality of I/O terminals from a ground voltage based upon said SCSI bus entering an idle state, said ground terminal being coupled to one conductor of said second set of conductors, (ii) generate a first status value that indicates whether said first SCSI device utilizes said wide SCSI bus width based upon a first voltage of said ground terminal, and (iii) couple said ground terminal to said ground voltage when said SCSI bus is in a busy state.

13. The computer system of claim 12, further comprising:

a second SCSI device configured to utilize a bus width selected from said group of bus widths;

a second SCSI port comprising a second plurality of I/O terminals configured to couple said second SCSI device to said SCSI bus via a second interconnect cable; and wherein said function of said termination control circuit is further dependent upon whether said second device is coupled to said second bus port and whether said second device utilizes said wide SCSI bus width.

14. The computer system of claim 12, further comprising:

a second detection circuit configured to generate a second status value that indicates whether said first SCSI device is coupled to said first SCSI port based upon a second voltage of a second I/O terminal of said first plurality of I/O terminals that is coupled with one conductor of said first set of conductors.

15. The computer system of claim 12, wherein:

said first detection circuit, in response to a reset signal on said SCSI bus, is configured to decouple said ground terminal from said ground voltage and to generate said first status value when said ground terminal is decoupled from said ground voltage.

* * * * *